(12) United States Patent
Guillaume

(10) Patent No.: US 6,577,955 B2
(45) Date of Patent: Jun. 10, 2003

(54) METHODS OF TOMOGRAPHICALLY INVERTING PICKED EVENTS ON MIGRATED SEISMIC DATA

(75) Inventor: Patrice Guillaume, Orsay (FR)

(73) Assignee: Compagnie Generale de Geophysique (FR)

( * ) Notice: Subject to any disclaimer, the term of this patent is extended or adjusted under 35 U.S.C. 154(b) by 0 days.

(21) Appl. No.: 10/090,366

(22) Filed: Mar. 4, 2002

(65) Prior Publication Data

US 2002/0183980 A1 Dec. 5, 2002

(30) Foreign Application Priority Data

Mar. 5, 2001 (FR) .............................. 01 02962

(51) Int. Cl.[7] ................................................ G01V 1/28
(52) U.S. Cl. ............................................. 702/14; 703/5
(58) Field of Search ............................. 702/14, 17, 18; 367/73, 38, 74, 54; 703/5

(56) References Cited

U.S. PATENT DOCUMENTS

| | | | | | |
|---|---|---|---|---|---|
| 4,596,005 A | * | 6/1986 | Frasier | ........................ | 367/38 |
| 4,953,142 A | * | 8/1990 | Rimmer | ....................... | 367/73 |
| 5,103,429 A | * | 4/1992 | Gelchinsky | .................. | 367/73 |
| 6,292,754 B1 | * | 9/2001 | Thomsen | ..................... | 702/14 |

* cited by examiner

*Primary Examiner*—Edward Lefkowitz
*Assistant Examiner*—Victor J. Taylor
(74) *Attorney, Agent, or Firm*—Duane Morris LLP

(57) ABSTRACT

A method of inverting events that have been picked from a depth-migrated seismic trace, wherein a collection of traces is determined by depth migration prior to addition, the traces reflecting vertically below, a given surface point, and processing is applied to said collection of traces in order to select a velocity field parameterization which optimizes the alignment of points which are migrated from said collection of traces.

7 Claims, 2 Drawing Sheets

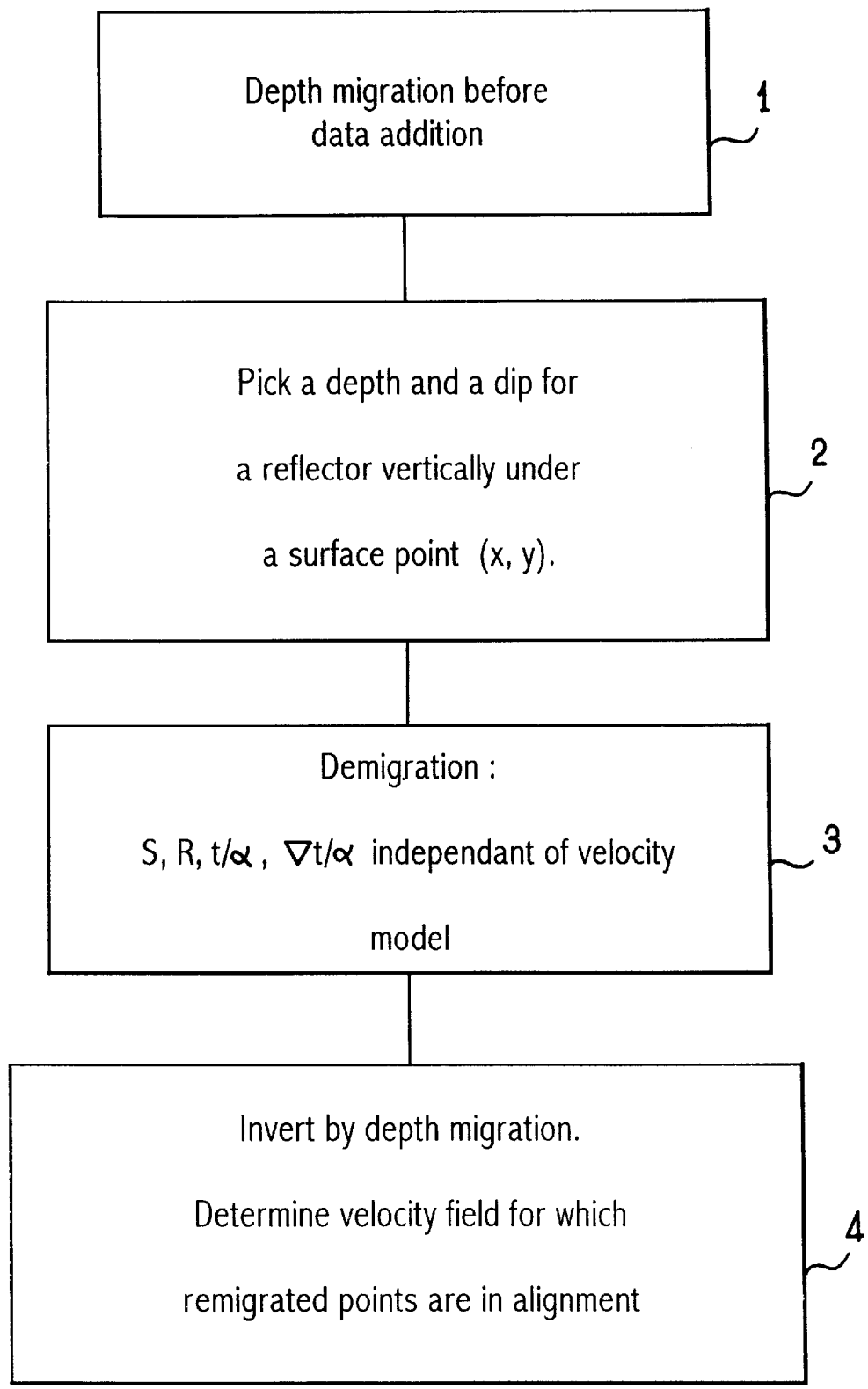
FIG_1

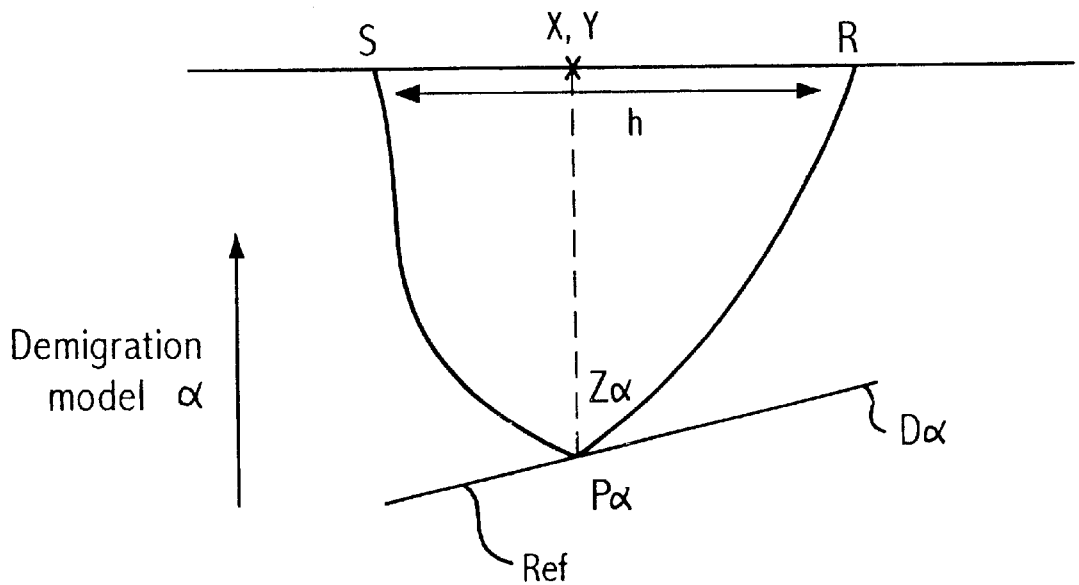
FIG_2
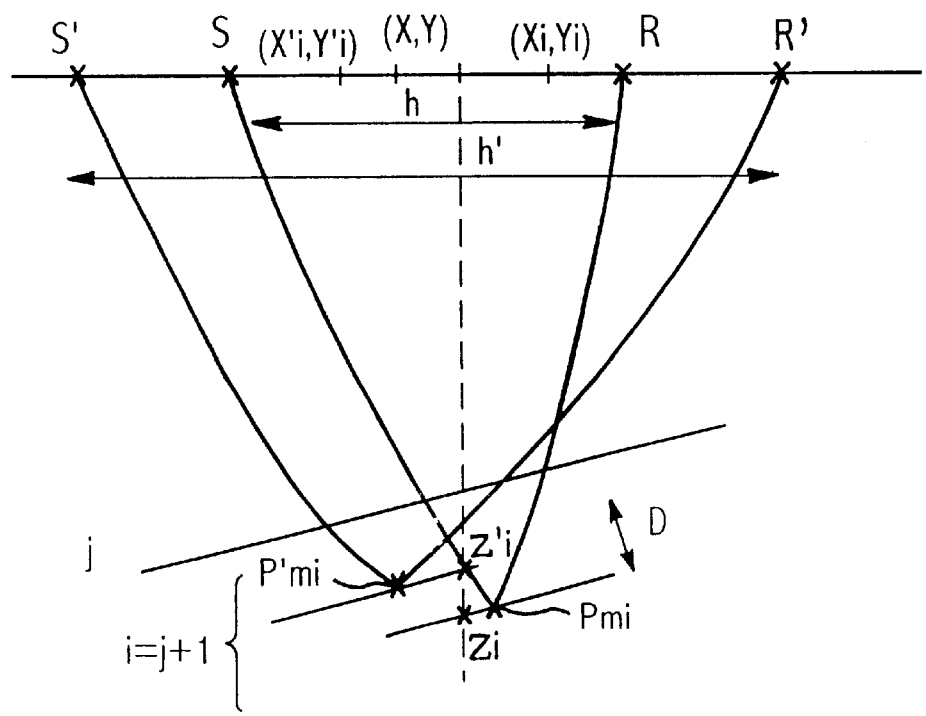
FIG_3

METHODS OF TOMOGRAPHICALLY INVERTING PICKED EVENTS ON MIGRATED SEISMIC DATA

PRIORITY

This application claims the benefit of French application number 0102962, filed on Mar. 5, 2001, and is an English translation thereof.

FIELD OF INVENTION

The present invention relates to methods of tomographically inverting picked events on seismic traces.

BACKGROUND OF THE INVENTION

To reconstruct images of the subsoil, geologists or geophysicists conventionally use sound emitters placed on the surface, for example. Such emitters emit waves which propagate through the subsoil and which are reflected on the surfaces of the various layers thereof (reflectors). Sound waves reflected to the surface are recorded as a function of time by receivers. The signals received by the receivers are known as seismic traces.

It is conventional to pick portions of such seismic traces which correspond to reflections of sound pulses emitted from the surface, and which correspond to reflectors of interest, and also to determine the travel times that correspond to such reflections.

Tomographic inversion techniques consist in modeling velocity fields within the subsoil as a function of the acquired seismic traces and of selected events.

Numerous inversion techniques are already known.

It is conventional to invert reflected wave arrival times, and in particular to determine the velocity field in the subsoil by minimizing the differences between the observed arrival times and the arrival times predicted b, the models, which times are calculated in the inversion model by tracing rays between the emitters and the sources Travel time inversion is difficult to implement association with geographical structures that are complex, in particular because of the lack of discrimination between multiple arrivals.

Other tomographic inversion techniques are techniques which make use of depth migration.

Depth migration prior to adding seismic data consists in determining, for each surface position (x,y), a collection of migrated traces conveying events which describe the subsoil vertically below such surface position (x,y). Such a collection of traces is generally ordered in classes of source-receiver distances (distances also referred to as "offset" distances), and also by classes of increasing specular angles, and more rarely by classes of source-receiver segment orientation.

When the velocity model used is a proper reflection of reality, then the depth associated with an event that is reflected vertically below a surface position is substantially constant regardless of the offset distance (or indeed the specular angle) of the trace in question.

Methods of tomographic inversion in depth use this characteristic to define the inversion criterion that is to be minimized.

In particular, an inversion method has been proposed in "Velocity analysis by iterative profile migration" by Kamal Al-Yahaya, Geophysics, Vol. 54, No. 6, 1989, pp. 718–729 in which the velocity model of the subsoil is determined by minimizing the departure from horizontal of the depth/distance curve for a collection of migrated traces.

To be able to implement that technique, it is necessary for a plurality of depth migrations to be performed, which is particularly troublesome to implement when several iterations are needed for convergence.

SUMMARY OF THE INVENTION

An object of the invention is to propose an inversion technique which significantly reduces the number of depth migrations to be performed in order to construct an optimum model, and which does not require large amounts of computer power.

To this end, the invention proposes a method of updating a subsoil velocity model, in which depth migration prior to data addition is implemented on a set of seismic traces acquired in register with said subsoil, the migration being implemented with the help of at least one starting velocity model and serving to determine one or more trace collections each describing the subsoil vertically below a point on the surface; one or more events which reflect vertically below the surface point under consideration are picked on at least one collection of traces obtained using said migration, and for each picked event a reflector depth and dip are determined, as is a reflector dip in register with said surface point; and ray tracing is implemented between said reflector point and the surface to determine collections of sound source and receiver pairs, together with data characteristic of travel times and time gradients which correspond to the ray traces associated with said pairs; wherein subsequent processing is implemented in which the following steps are iterated: dynamically migrating travel time and time gradient data previously obtained with the help of paramet6rization of the velocity field; characterizing the alignment of the migrated points obtained in this way; and updating the parameterization; the processing selecting the velocity field parameterization which optimizes the alignment of said migrated points.

The above three steps can be repeated until an alignment that is judged to be satisfactory is obtained.

It should be observed that the processing proposed in this way for selecting the parameterization of the velocity field does not require seismic data to be migrated in depth (which is very expensive) every time after each velocity update.

Consequently, it will be understood that the method proposed by the invention can be implemented without requiring large amounts of computer power.

In an advantageous implementation, the depth migration prior to addition of the seismic data is implemented for a plurality of velocity fields (common reflection point [CRP] scan, for example), and in order to determine the reflector depth and dip, that one of the velocity fields is selected which minimizes the departure from the horizontal of the depth/offset distance curve or of the depth/specular angle curve.

Furthermore, the depth of the reflector can advantageously be determined for different offsets or specular angles.

In one possible preferred implementation, in order to select a velocity field parameterization which optimizes the alignment of the points that are migrated from the time and time gradient seismic data, the distance is determined between the reflector portions seen for different offsets of the collection, with the selected velocity field parameterization being that which minimizes said distance.

In another implementation, in order to select a velocity field parameterization which optimizes the alignment of the points which are migrated from the time and time gradient data, the depth differences between the intercept points between a given vertical and previously updated reflector portions parallel to the reflector and which pass through the new migrated points, with the selected velocity field parameterization being that which minimizes said difference.

In another variant, the dips considered for each offset of a given collection need not be parallel, in which case they can be determined from the rays.

It is also possible to implement the following steps in order to select a parameterization for the velocity field: a local reflector passing through a migrated point is determined; the other rays of the collection are traced between said local reflector and the surface; a time error is determined which is a function of the difference between the travel time corresponding to at least one of said rays and the travel time of the trace which, in the collection, corresponds to the same offset distance or the same specular angle; and a velocity field parameterization is selected which minimizes said time error and optimizes the alignment of the points which are migrated from the time and time gradient seismic data.

In a variant, or in addition, it is also possible to implement the following steps: a reflector is determined passing through a migrated point; the other rays of the collection are traced between said reflector and the surface; a time error is determined which is a function of the difference between the travel time gradient corresponding to at least one of said rays and the travel time gradient of the trace which, in the collection, corresponds to the same offset distance or to the same specular angle; and a velocity field parameterization is selected which minimizes said time error and optimizes the alignment of points which are migrated from the time and time gradient seismic data.

BRIEF DESCRIPTION OF THE DRAWINGS

Other characteristics and advantages of the invention appear further from the following description, which is purely illustrative and non-limiting, and which should be read with reference to the accompanying drawings, in which:

FIG. 1 is a flow chart showing one possible way of implementing the invention;

FIG. 2 is a diagram of the subsoil showing how certain steps of the FIG. 1 processing are implemented; and FIG. 3 is a diagram showing other steps.

DETAILED DESCRIPTION OF SEVERAL PREFERRED EMBODIMENTS

The processing shown in FIG. 1 comprises a first step 1, which consists in migrating seismic data in depth in order to determine, for a point on the surface of given X, Y coordinates, those events which, for a collection of seismic traces, all correspond to reflection at a point vertically beneath said point.

This migration is determined with an initial model of subsoil velocities. This model may comprise a plurality of layers.

For each of the layers in the initial model, the velocity field can be of the following type, for example:

$$V(x,y,z) = (V0(x,y) + k(x,y)*z)*An(\epsilon, \delta, \theta \text{phase})$$

where: x, y and z are the coordinates of the subsoil point under consideration, with z being its depth;

V(x,y,z) is the velocity of sound at the point having the coordinates x, y, z in the subsoil;

V0(x,y) and k(x,y) are both functions which depend on the coordinates x and y; and An($\epsilon$, (x,y) $\delta$ (x,y), $\theta$) is a term describing anisotropy and which can depend on x and y, where $\epsilon$ and $\delta$ are the weak anisotropic parameters described by Thomsen (Geophysics 1986), for example, and where $\theta$ is the phase angle describing the propagation direction of the waves.

The depth migration processing prior to addition can advantageously also be implemented for a plurality of velocity models corresponding to different possible perturbations relative to the initial velocity model.

By way of example, these perturbations can be of the linear type and a function of a perturbation coefficient which is given different values so as to have different models that are adjacent to the initial velocity field model. The perturbation can be applied either to a single layer, or to the entire model.

To return to the example given above of an initial velocity model, a perturbed velocity model could be as follows:

$$V_\alpha(k,y,z) = (\alpha V0(x,y) + k(x,y)*z)*An$$

for a perturbation applied solely to one layer, or else:

$$V_\alpha(x,y,z) = \alpha(V0(x,y) + k(x,y)*z)*An$$

for a perturbation applied solely to the entire model, where $\alpha$ is the distance parameter and has value that varies in the range 0.8 to 1.2, for example.

This technique of scanning through several velocity models by means of a linear coefficient is known as a "CRP-scan" and, in the case of 3D migration, is described in the following article, for example, Audebert, Diet, Zhang, "CRP scans for 3D pre-stack Depth Migration: A powerful combination of CRP-gathers and velocity scan", SEG, 1996, Expanded Abstracts-pp. 515–518.

After migration, in a second step (step 2 in FIG. 1), the depth and the dip are examined of the reflector that is to be updated vertically below the surface point having the (x,y) coordinates under consideration.

When a plurality of velocity models have been scanned, the model having the smallest departure from horizontal in the depth/offset distance curve is fixed, with the depth Z$\alpha$ and the dip D$\alpha$ that are determined for the reflector then being a function of the model that has been picked in this way.

Once this dip and this depth have been determined, processing that is the inverse of the migration processing is implemented using the velocity model under consideration (i.e. the model having the linear coefficient a which corresponds to the smallest departure from the horizontal).

This processing, referred to as "denigration" treatment (FIG. 2), consists in tracing rays for each offset and, as a function of the source-receiver orientation from a reflector (reflector Ref. in the figure) corresponding to the depth (a function of the offset) and to the dip that are determined as existing vertically below the surface point having the coordinates (x,y).

The data obtained by this inverse ray tracing from the reflector to the surface has the advantage of being totally independent of the velocity model under consideration. This data comprises, in particular, the positions on the surface of the source-receiver pairs (S,R) corresponding to a reflection on the reflector Ref., and the travel times and the time gradients which correspond to the computed rays, said travel times and time gradients being independent of the velocity model under consideration when they are weighted relative to the coefficient a with which the demigration treatment was implemented (t/α and Vt/α in FIG. 2 for a disturbance applied to the model).

In this respect, reference can advantageously be made to the following article: Audebert, Diet, Guillaume, Jones, Zhang-"CRP-scans: 3D PreSDM Velocity Analysis via Zero Offset Tomographic Inversion," 1997, Expanded Abstracts, Soc. Expl. Geophys., pp. 1805–1808.

In a following step (step 4 in FIG. 1), processing is implemented on the data obtained in this way, which processing consists, for a given selected offset distance h, in ray trace migration to determine the reflection point of the source/receiver pair S, R which corresponds to said offset distance h, and which complies with the previously established travel time and time gradients.

This dynamic migration is performed either in the migration model, or after introducing a perturbation to the velocity model used in demigration step 3.

As shown in FIG. 3, this new migration makes it possible to determine a new migrated point Pmi, which point is defined by its depth Zi and by the coordinates (Xi,Yi), which correspond to the coordinates of the point on the surface vertically above the point Pmi.

This migration is implemented for various offset distances, or equivalently for various specular angles, in the collection of traces obtained at the end of step 3.

As shown in FIG. 3, the various migrated points (specifically Pmi PImi) obtained for the various offset distances (specifically h, h'), or these various specular angles, are dispersed laterally and not concentrated on the point Pα.

Nevertheless, the proposed method takes advantage of the fact that when the velocity model used is a correct reflection of reality, then these various migrated points must be in alignment on a common portion of reflector.

Making the assumption that the reflector i that is to be updated can be compared with the reflector i which corresponds to the previously updated layer (which is increasingly close to reality with decreasing residual curvature), it is possible to characterize the fact that the remigrate points (Pmi, P'mi in FIG. 3) are more or less in alignment on a common portion of reflector.

Using this assumption, it is possible to determine the velocity field that is being sought by minimizing the distance between the reflector portions seen by the various traces of the collection migrated in step 3 (distance D in FIG. 3), these reflector portions being assumed to be parallel or almost parallel to the reflector j.

Yet another criterion can consist in minimizing the differences between the depths of the intercept points between a vertical (e.g. through the center of gravity of the migrated locations) and the reflector portions that are more or less parallel to the previously updated reflector j and passing through the new migrated points (difference between the coordinates Zi and Z'i in FIG. 3).

In either case, minimization is implemented by modifying the parameterization of the velocity model in successive iterations.

As examples, the parameterization perturbations used successively can be determined as a function of ray traces calculated during each new migration for the offset distances or the specular angles under consideration, in the manner which is described in Liu et al., 1994, "Velocity analysis by perturbation" Sixty-fourth Annual International Meeting, Soc. Expl. Geophys., expanded abstracts, 1991–1994; Liu et al., 1995, "Migration velocity analysis: theory and iterative algorithm, Geophysics, 60–142–153; and Wang et al., "Macro velocity model estimation through model based globally optimized residual curvature analysis," Expanded abstracts, Soc. Expl. Geophys., 1596–1599 (1998); the techniques described in those articles using the fact that the velocity fields v and the depth fields z of the ray reflection points satisfy:

$$\partial z/\partial v = A \partial t/\partial v$$

where t is the travel time of the ray and A is a parameter which is a function of the dip of the subsoil and can be calculated in particular on the basis of the ray.

Furthermore, the processing for selecting the parameterization of the velocity fields can take other criteria into consideration in addition to optimizing the alignment of points which are migrated from said collection of traces.

In particular, it is also possible, e.g. for the offset distance which corresponds to the migrated point Pmi closest to the reflector Ref., to determine the reflector portion which corresponds to said point Pmi and which is parallel to the updated layer j. Then, for each of the traces in the collection obtained at the end of step 3, the ray which is reflected on the portion of this reflector No is traced. The rays obtained in this way have travel times and time gradients different from those obtained at the end of step 3. The differences between the times or time gradients obtained at the end of step 3 and those obtained by these ray traces constitute error attributes which can also be used to characterize convergence of the selected velocity field on the real velocity field.

I claim:

1. A method of updating a subsoil velocity model, in which:
   a. implementing depth migration prior to data addition on a set of seismic traces acquired in register with said subsoil, the migration being implemented with the help of at least one starting velocity model and serving to determine one or more trace collections each describing the subsoil vertically below a point on the surface;
   b. picking one or more events which reflect vertically below the surface point under consideration on at least one collection of traces obtained using said migration;
   c. determining a reflector depth and dip for each picked event as well as a reflector dip in register with said surface point; and
   d. implementing ray tracing between said reflector and the surface to determine collections of sound source and receiver pairs, together with data characteristic of travel times and time gradients which correspond to the ray traces associated with said pairs;
   e. wherein subsequent processing is implemented in which the following steps are iterated:
      i. dynamically migrating travel time and time gradient data previously obtained with the help of parameterization of the velocity field;
      ii. characterizing the alignment of the migrated points obtained in this way; and
      iii. updating the parameterization; the processing selecting the velocity field parameterization which optimizes the alignment of said migrated points.

2. A method according to claim 1, wherein:
   a. implementing the depth migration prior to addition of the seismic data for a plurality of velocity fields, and
   b. selecting, in order to determine the reflector depth and dip, one of the velocity fields which minimizes the departure from the horizontal of the depth/offset distance curve or of the depth/specular angle curve.

3. A method according to claim 1, wherein:
a. determining the reflector depth for different offsets or different specular angles.

4. A method according to claim 1, wherein:
a. determining, in order to select a velocity field parameterization which optimizes the alignment of the points that are migrated from the time and time gradient seismic data, the distance between the reflector portions seen for different offsets, with the selected velocity field parameterization being that which minimizes said distance.

5. A method according to claim 1, wherein:
a. in order to select a velocity field parameterization which optimizes the alignment of the points which are migrated from the time and time gradient data, the depth differences between the intercept points between a given vertical and previously updated reflector portions parallel to the reflector and which pass through the new migrated points, with the selected velocity field parameterization being that which minimizes said difference.

6. A method according to claim 1, wherein:
a. in order to select a velocity field parameterization:
   i. determining a local reflector passing through a migrated point;
   ii. tracing other rays of the collection between said local reflector and the surface;
   iii. determining a time error which is a function of the difference between the travel time corresponding to at least one of said rays and the travel time of the trace which, in the collection, corresponds to the same offset distance or the same specular angle; and
   iv. selecting a velocity field parameterization which minimizes said time error and optimizes the alignment of the points which are migrated from the time and time gradient seismic data.

7. A method according to claim 1, wherein:
a. in order to select a velocity field parameterization:
   i. determining a reflector passing through a migrated point;
   ii. tracing other rays of the collection between said reflector and the surface;
   iii. determining a time error which is a function of the difference between the travel time gradient corresponding to at least one of said rays and the travel time gradient of the trace which, in the collection, corresponds to the same offset distance or to the same specular angle; and
   iv. selecting a velocity field parameterization which minimizes said time error and optimizes the alignment of points which are migrated from the time and time gradient seismic data.

* * * * *